(12) United States Patent
Gestermann et al.

(10) Patent No.: US 7,658,835 B2
(45) Date of Patent: Feb. 9, 2010

(54) METHOD FOR THE ELECTROLYSIS OF AN AQUEOUS SOLUTION OF HYDROGEN CHLORIDE OR ALKALI METAL CHLORIDE

(75) Inventors: Fritz Gestermann, Leverkusen (DE); Richard Malchow, Köln (DE); Walter Hansen, Leverkusen (DE); Gaby Sengstock, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 665 days.

(21) Appl. No.: 10/937,563

(22) Filed: Sep. 10, 2004

(65) Prior Publication Data

US 2005/0056549 A1    Mar. 17, 2005

(30) Foreign Application Priority Data

Sep. 12, 2003    (DE) ................. 103 42 148

(51) Int. Cl.
*C25C 1/02*    (2006.01)
(52) U.S. Cl. .................................... 205/628
(58) Field of Classification Search ................. 204/198; 205/633, 343, 628, 632
See application file for complete search history.

(56) References Cited

U.S. PATENT DOCUMENTS

| | | | | |
|---|---|---|---|---|
| 3,947,340 A | * | 3/1976 | Kawagoshi et al. ......... 204/490 |
| 4,299,682 A | * | 11/1981 | Oda et al. .................. 204/265 |
| 4,374,819 A | * | 2/1983 | Palilla et al. ................. 423/570 |
| 5,770,032 A | | 6/1998 | Faita |
| 6,203,771 B1 | * | 3/2001 | Lester et al. ................ 423/219 |
| RE37,433 E | * | 11/2001 | Zimmerman et al. ......... 205/620 |
| 6,402,929 B1 | | 6/2002 | Sakata et al. |
| 7,056,361 B1 | * | 6/2006 | Ebert et al. ................ 48/214 R |
| 2003/0236163 A1 | * | 12/2003 | Chaturvedi et al. ......... 502/305 |
| 2004/0074780 A1 | * | 4/2004 | Twardowski et al. ........ 205/618 |

FOREIGN PATENT DOCUMENTS

| | | |
|---|---|---|
| DE | 10138215 | 2/2003 |
| EP | 1067215 | 1/2001 |
| JP | 05144453 A * | 6/1993 |

OTHER PUBLICATIONS

Trimm, "Materials Selection and Design of High Temperature Catalytic Combustion Units", Catalysis Today, vol. 26 (no month, 1995), pp. 231-238.*
Heck et al., "The Application of Monoliths for Gas Phase Catalytic Reactions", Chem. Eng. J., vol. 82 (no. month, 2001), pp. 149-156.*

* cited by examiner

*Primary Examiner*—Enda Wong
(74) *Attorney, Agent, or Firm*—Connolly Bove Lodge & Hutz LLP

(57) ABSTRACT

A method is described for the electrolysis of an aqueous solution of hydrogen chloride or alkali metal chloride in an electrolysis cell. The cell includes at least of an anode half-element and an anode, a cathode half-element and a gas diffusion electrode as the cathode, and a cation exchange membrane for separating the anode half-element and the cathode half-element. A gas containing oxygen is supplied to the cathode half-element and excess gas containing oxygen is discharged from the cathode half-element. Excess gas containing oxygen discharged from the cathode half-element is subjected to catalytic oxidation of hydrogen.

11 Claims, 1 Drawing Sheet

METHOD FOR THE ELECTROLYSIS OF AN AQUEOUS SOLUTION OF HYDROGEN CHLORIDE OR ALKALI METAL CHLORIDE

CROSS REFERENCE TO RELATED APPLICATIONS

This application claims priority under 35 USC 119 from German Application No. 10342148.3 filed Sep. 12, 2003, the content of which is incorporated herein by reference in its entirety.

BACKGROUND OF THE INVENTION

1. Field of the Invention

The present invention relates generally to a method for the electrolysis of an aqueous solution of hydrogen chloride or alkali metal chloride using a gas diffusion electrode as the cathode.

2. Description of Related Art

The electrolysis of aqueous solutions of hydrogen chloride (hydrochloric acid) and aqueous alkali metal chloride solutions can be conducted electrolytically using gas diffusion electrodes as oxygen-consuming cathodes. In such a case, oxygen, air or oxygen-enriched air are fed in excess into the electrolysis cell. By using oxygen-consuming cathodes, the electrolysis voltage is reduced by approx. 30% compared with conventional hydrochloric acid or chloralkali electrolyses.

A method for the electrolysis of hydrochloric acid is known, for example, from U.S. Pat. No. 5,770,035. An anode space with a suitable anode, including, for example, a substrate made of a titanium-palladium alloy, which is coated with a ruthenium, iridium and titanium mixed oxide, is filled with hydrochloric acid. The chlorine formed at the anode escapes from the anode space and is subjected to further processing. The anode space is separated from the cathode space by a commercially available cation exchange membrane. On the cathode side, there is a gas diffusion electrode (oxygen-consuming cathode) adjoining the cation exchange membrane. The oxygen-consuming cathode in turn adjoins a current distributor. The oxygen supplied to the cathode space is reacted on the oxygen-consuming cathode.

EP-A 1 067 215 discloses a method for the electrolysis of an aqueous alkali metal chloride solution using an oxygen-consuming cathode. The electrolysis cell includes an anode half-element and a cathode half-element, which are separated from each other by a cation exchange membrane. The cathode half-element includes an electrolyte space and a gas space. The electrolyte space is separated from the gas space by an oxygen-consuming cathode. The electrolyte space is filled with an alkali metal hydroxide solution. The gas space is supplied with oxygen. The anode space is filled with a solution containing alkali metal chloride.

The formation of hydrogen on oxygen-consuming cathodes should generally be prevented. Inter alia because of competition reactions, however, traces of hydrogen may even be formed if the oxygen supply is sufficient. The hydrogen is drawn off from the cathode space together with the excess oxygen. According to previous methods, the oxygen is released into the waste air after off-gas purification, since recycling risks that hydrogen concentration will rise to above its explosion limit of 4 vol. %.

SUMMARY OF THE INVENTION

It was an object of the present invention for excess oxygen to be recycled in an economically viable way. A method is provided wherein excess oxygen can be made available to a electrolysis process.

The invention relates to a method suitable for the electrolysis of an aqueous solution of hydrogen chloride or alkali metal chloride in an electrolysis cell, of the cell comprising an anode half-element and an anode, a cathode half-element and a gas diffusion electrode as the cathode, and a cation exchange membrane separating the anode half-element and the cathode half-element. A gas containing oxygen is supplied to the cathode half-element and excess gas containing oxygen is discharged from the cathode half-element. Excess gas containing oxygen discharged from the cathode half-element is subjected to catalytic oxidation of hydrogen.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWING

The invention will be explained in more detail below with reference to FIG. 1.

DETAILED DESCRIPTION OF A PREFERRED EMBODIMENT

Figure 1:
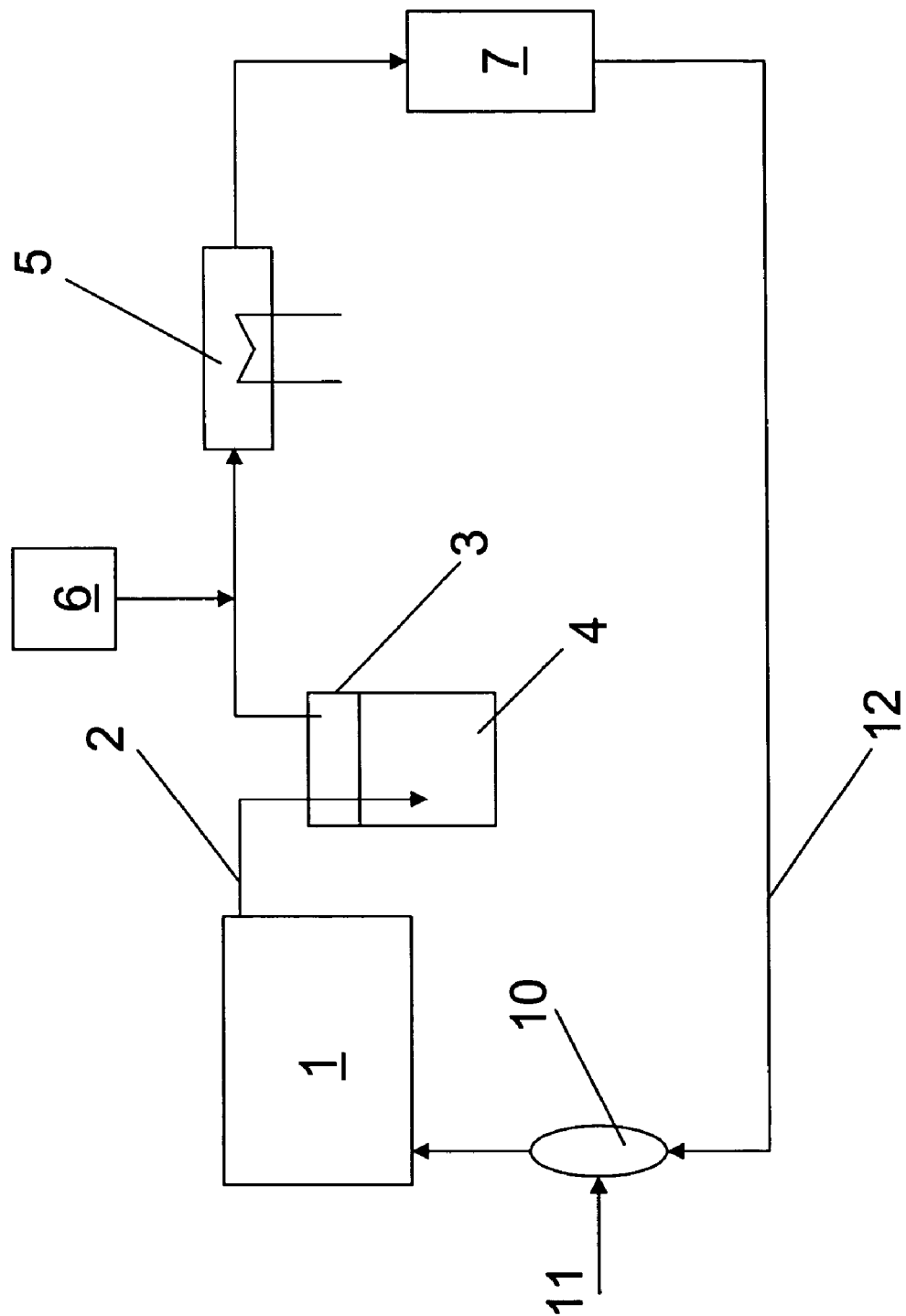
FIG. 1 shows a flow chart of an embodiment of the method according to the invention, as was used for test purposes in the following example.

The oxygen supplied to the cathode half-element, or the supplied air which is optionally enriched with oxygen, is referred to herein as simply "oxygen" for the sake of simplicity.

The gas containing oxygen, which is fed in excess into the cathode half-element, can be, for example, oxygen, air and/or oxygen-enriched air. With the aid of the catalytic oxidation, hydrogen, which is present in the excess gas leaving the cathode half-element, the level of hydrogen can be reduced, in particular, typically to at most about 2 vol. %. This makes it possible for excess oxygen to be re-supplied to the cathode half-cell, without risking overly concentrating up to the explosion limit of the oxygen/hydrogen mixture during repeated recycling.

For the catalytic oxidation of hydrogen, in a preferred embodiment, excess oxygen enriched gas containing oxygen is sent through a catalytic converter, including a support body made of ceramic or metal, most preferably ceramic, and a coating containing a catalytically active noble metal, capable of oxidizing hydrogen.

The support body of the catalytic converter is preferably monolithic. The monolithic support body of the catalytic converter preferably has a high specific surface area. It is, however, also possible to use a bed of material (such as monolithic material) as the support body, in order to achieve high specific surface area. The monolithic support body preferably has a multiplicity of channels, which may have any cross section. The monolithic support body may, for example, be constructed from essentially parallel channels which are not connected together transversely to the flow direction. It may, however, if desirable for any any reason, also include crosscurrent channels or comprise a foam, as further examples. The support body may, for example, be honeycombed or have any desired structure.

The wall thickness of the catalytic-converter channels should preferably be relatively small, in order to achieve minimum flow resistance for a given cross section of the catalytic-converter unit. A typical minimum wall thickness for ceramic support bodies can be approx. about 0.3 mm. Thermal and mechanical damage to ceramic support bodies may occur if the wall thickness is much less than about 0.3 mm. The use of a metal support body may allow a smaller minimum wall thickness, e.g. approx. about 0.05 mm. The diameter of the channels can be, for example, about 0.5 cm. Owing to its small wall thickness, the support body is heated rapidly and it is quickly ready for operation after the system is started.

A ceramic support body can be, for example, produced by any method such as by extrusion. In order to produce a metal support body, for example, metal foil can be formed like corrugated cardboard to produce two flat metal foils with corrugated metal foil lying in between.

Preferred metals for the support body include any desired, such as, for example, titanium and/or stainless steel. A preferred ceramic support body can be, for example, aluminium oxide.

The support body can be provided with a coating preferably containing at least one catalytically active noble metal, for example, any desired such as platinum and/or rhodium. The coating preferably contains platinum. The coating may also contain platinum and rhodium, for example, in a suitable weight ratio of about 5 parts platinum to about 1 part rhodium. A preferred loading for the coating can be, for example, from about 1.4 to about 1.8 mg/cm$^3$. A larger amount of coating, that is approx. about 2.7 mg/cm$^3$, or possibly more can also be utilized in some embodiments.

At least one interlayer may also be applied between the support body and the coating. A role of the interlayer is to increase the specific surface area of the catalytic converter. The interlayer can be formed of any desired material such as aluminium oxide, for example, in which case the specific surface area is approx. up to about 5000 times more than without an interlayer.

Commercially available catalytic converters for exhaust-gas purification, for example, such as those used for petrol or diesel engines, or oxidation catalytic converters such as those used for diesel-driven lorries or buses (for example, HJS Kat 2000™ from HJS Fahrzeugtechnik GmbH Co., Germany) may be used as a catalytic converter for a method according to the present invention.

Instead of a single catalytic converter, it is also possible to connect a plurality of catalytic converters in parallel, for example, to oxidize gas streams having a high hydrogen content, while at the same time keeping the pressure drop relatively small due to the serial and/or parallel arrangement.

Excess gas containing oxygen is preferably sent through a catalytic converter at a temperature of from about 120 to about 300° C., particularly preferably from about 150 to about 180° C. This may be done either by heating the oxygen before it enters the catalytic converter, for example, using a heat exchanger, and/or by heating the catalytic converter itself. A metal catalytic converter may, for example, be heated in any way such as inductively. The catalytic converter may also be provided with a heating jacket in order to supply heat as another example.

The pressure drop when flowing through the catalytic converter is preferably less than about 100 mbar, particularly preferably less than about 10 mbar. Depending on the size of the catalytic converter selected, the flow rate of the oxygen may need to be limited to permit operation of the catalytic converter without a significant pressure drop. A pressure increase in the catalytic converter when increasing the flow rate may be disadvantageous for electrolysis, in particular for electrolysis of an aqueous solution of hydrogen chloride. For hydrochloric acid electrolysis, as is known from DE-A 10 138 215 (incorporated herein by reference), the anode half-cell is generally kept at a higher pressure than the cathode half-cell. Owing to the typical higher pressure in the anode half-cell, the cation exchange membrane is often pressed onto the gas diffusion electrode, which in turn then becomes pressed onto the current distributor. If too high a pressure drop were to occur in the catalytic converter, the pressure in the cathode half-cell may increase and the gas diffusion electrode could then be pushed away from the current distributor. When recycling sizeable oxygen streams, connecting a plurality of catalytic converters in parallel or selecting a correspondingly large catalytic converter is therefore advantageous in order to avoid pressures which are too high in the catalytic converter. Alternatively, the pressure on the anode side can optionally be raised simultaneously with the pressure drop on the cathode side, so as to maintain the pressure difference between the cathode space and the anode space.

Excess gas containing oxygen is preferably re-supplied to the cathode half-element after the catalytic oxidation of hydrogen. In order to provide excess oxygen at all times, oxygen and/or air and/or oxygen-enriched air can also be supplied to the cathode half-element. The freshly supplied oxygen can be, for example, mixed with the purified oxygen stream before and/or after it enters the cathode half-element if desired for any reason.

With a method according to the invention, for example, it is possible to purify approx. about 70 to about 100 m$^3$/h of excess oxygen (oxygen off-gas stream) from an electrolyser with a chlorine production of approx. about 10,000 t.p.a. without significant pressure build-up when using only a single catalytic converter.

EXAMPLES

An oxygen off-gas stream 2 with a flow rate of from about 2 to about 6.5 m$^3$/h, which was saturated with water vapor and was at a temperature of approx. 50° C., was discharged from the cathode space of a pilot electrolyser 1 having five elements, each with an area of 0.88 m$^2$. The off-gas stream 2 was immersed approx. 30 cm deep in a container 3, which collected the water of reaction 4 flowing away through a separate outlet (the water of reaction, or cathode condensate, includes very dilute hydrochloric acid, of approx. 1 wt. % strength).

Metered amounts of hydrogen from a hydrogen source 6 were supplied to the oxygen off-gas stream 2 leaving the container 3. A laboratory electrolysis cell for the electrolysis of water, in which hydrogen had been cathodically formed, was used as the hydrogen source 6. The oxygen off-gas stream 2 with hydrogen added was sent through a stainless-steel pipe, which was externally heated by an electrical heating strip 5 with a heating power of 750 watts so that it was heated to approx. 150 to 180° C. The off-gas stream 2 was then sent through a catalytic converter 7, here a standard car catalytic converter of the type HJS VW 80/Coupe type 81™ from HJS Fahrzeugtechnik GmbH Co., Germany.

Both the pipe leading to the catalytic converter 7 and the catalytic converter 7 itself were thermally insulated. In the catalytic converter 7, any hydrogen gas present reacted with the oxygen off-gas 2 to form water. The catalytic converter 7 was preferably arranged vertically, so that the oxygen off-gas stream 2 flew from the top downwards through the catalytic converter 7. If it was not present as water vapor so that it could leave the catalytic converter 7 in the form of a gas, the water formed in the catalytic converter 7 preferably flew downward and out of the catalytic converter 7.

The oxygen off-gas 12 leaving the catalytic converter 7 was preferably virtually hydrogen-free when working temperature of at least about 150 to about 180° C. was employed, and the gas 12 preferably had a maximum hydrogen concentration of approx. about 10 vol. ppm.

The off-gas stream 12, from which hydrogen had been removed, was preferably mixed with fresh oxygen 11 and supplied to the cathode half-element of the electrolyser 1 by a nozzle 10, for example, a Venturi nozzle.

The following table reports the hydrogen concentrations ($H_2$ conc.) in vol. ppm before and after the catalytic oxidation in the catalytic converter 7, as well as the temperatures of the oxygen off-gas stream 2, 12 before and after the catalytic converter 7. The hydrogen concentration was measured by means of a catalytic measuring cell from Zellweger™ before the catalytic converter 7, and by a mobile gas chromatograph from Agilent™ after the catalytic converter 7. The hydrogen concentration before the catalytic converter 7 corresponds substantially to the amount of hydrogen which was supplied to the oxygen off-gas stream 2 by means of the hydrogen source 6. Also measured was the flow rate of the freshly supplied oxygen 11, which was mixed by means of a nozzle 10 with the oxygen off-gas stream 12, from which the hydrogen had been removed, before the oxygen gas stream entered the electrolyser 1.

The experiments show the dependency of the hydrogen elimination on the temperature of the oxygen off-gas stream 2 before the catalytic converter. At a temperature of about 198° C., the hydrogen concentration was reduced to less than about 10 vol. ppm, in spite of a high initial concentration of 6000 ppm.

| $H_2$ conc. [ppm] before catalytic converter | $H_2$ conc. [ppm] after catalytic converter | Temperature [° C.] before catalytic converter | Temperature [° C.] after catalytic converter | Flow rate of fresh oxygen [m³/h] |
|---|---|---|---|---|
| 766 | 13 | 158 | 128 | 3.6 |
| 2039 | 12 | 155 | 123 | 3.6 |
| 3994 | 12 | 155 | 127 | 3.6 |
| 6000 | 7 | 198 | 147 | 3.0 |
| 100 | 10 | 147 | 123 | 3.6 |

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

The invention claimed is:

1. A method for electrolysis of an aqueous solution of hydrogen chloride and/or alkali metal chloride in an electrolysis cell, said cell comprising an anode half-element and an anode, a cathode half-element and a gas diffusion electrode as a cathode, a cation exchange membrane for separating the anode half-element and the cathode half-element, said method comprising:
  supplying a gas comprising oxygen to the cathode half-element,
  subjecting said aqueous solution to electrolysis in said cell,
  discharging excess gas containing oxygen and hydrogen from the cathode half-element,
  subjecting said excess gas containing oxygen and hydrogen, after said excess gas has been discharged from the cathode half-element, to catalytic oxidation of said hydrogen to reduce the level of hydrogen in said excess gas thereby forming reduced hydrogen excess gas, and
  supplying said reduced hydrogen excess gas to the cathode half-element.

2. The method according to claim 1, further comprising subjecting the excess gas containing oxygen and hydrogen to a catalytic converter, wherein said catalytic converter is capable of oxidizing hydrogen and said catalytic converter comprises a support body made of ceramic and/or metal, and a coating comprising a catalytically active noble metal.

3. The method according to claim 2, wherein said coating comprises platinum.

4. The method according to claim 3, wherein said catalytic converter further comprises an interlayer comprising aluminum oxide, between the support body and the coating.

5. The method according to claim 2, wherein said coating comprises platinum and/or rhodium.

6. The method according to claim 5, wherein said catalytic converter further comprises an interlayer comprising aluminum oxide, between the support body and the coating.

7. The method according to claim 2, wherein said catalytic converter further comprises an interlayer comprising aluminum oxide, between the support body and the coating.

8. The method according to claim 2, further comprising subjecting said excess gas containing oxygen and hydrogen to the catalytic converter at a temperature of from about 120 to about 300° C.

9. The method of claim 8, wherein said temperature is from about 1500-180° C.

10. The method according to claim 2, wherein the pressure of said excess gas containing oxygen and hydrogen drops when flowing through said catalytic converter and the pressure drop when flowing through the catalytic converter is less than about 100 mbar.

11. The method of claim 10, wherein said pressure drop is less than about 10 mbar.

* * * * *

UNITED STATES PATENT AND TRADEMARK OFFICE
CERTIFICATE OF CORRECTION

| | | |
|---|---|---|
| PATENT NO. | : 7,658,835 B2 | Page 1 of 1 |
| APPLICATION NO. | : 10/937563 | |
| DATED | : February 9, 2010 | |
| INVENTOR(S) | : Fritz Gestermann et al. | |

It is certified that error appears in the above-identified patent and that said Letters Patent is hereby corrected as shown below:

In the Claims:

In Claim 9 at column 6, line 51, it states "The method of claim 8, wherein said temperature is from about 1500-180° C", and should read -- The method of claim 8, wherein said temperature is from about 150°-180° C --.

Signed and Sealed this

Ninth Day of November, 2010

David J. Kappos
*Director of the United States Patent and Trademark Office*